United States Patent
Chester et al.

(10) Patent No.: US 11,879,671 B1
(45) Date of Patent: Jan. 23, 2024

(54) METHOD FOR OPTICAL COOLING THROUGH SEMICONDUCTOR NANOPARTICLE ANTI-STOKES PHOTOLUMINESCENCE

(71) Applicant: Mainstream Engineering Corporation, Rockledge, FL (US)

(72) Inventors: Gregory E. Chester, Rockledge, FL (US); Ryan D. Reeves, Melbourne, FL (US); Justin J. Hill, Rockledge, FL (US)

(73) Assignee: Mainstream Engineering Corporation, Rockledge, FL (US)

(*) Notice: Subject to any disclaimer, the term of this patent is extended or adjusted under 35 U.S.C. 154(b) by 0 days.

(21) Appl. No.: 18/133,844

(22) Filed: Apr. 12, 2023

Related U.S. Application Data

(62) Division of application No. 17/514,038, filed on Oct. 29, 2021, now Pat. No. 11,686,510, which is a division of application No. 16/583,366, filed on Sep. 26, 2019, now Pat. No. 11,199,343.

(51) Int. Cl.
*F25B 23/00* (2006.01)
*G02B 6/26* (2006.01)

(52) U.S. Cl.
CPC ............ *F25B 23/003* (2013.01); *G02B 6/262* (2013.01)

(58) Field of Classification Search
CPC .............................. F25B 23/003; G02B 6/262
See application file for complete search history.

(56) References Cited

PUBLICATIONS

Rakovich et al., Anti-Stokes cooling in semiconductor nanocrystal quantum dots: A feasibility study; PSS A 206, No. 11, 2497-2509 (Year: 2009).*

* cited by examiner

*Primary Examiner* — Emmanuel E Duke
(74) *Attorney, Agent, or Firm* — Michael W. O'Neill, Esq.

(57) ABSTRACT

A process is disclosed for cooling a material that includes semiconductor nanoparticles in matrix material by anti-Stokes up-conversion. The semiconductor nanoparticle matrix is irradiated by a laser with a photonic wavelength matched to the anti-Stokes photoluminescence of the semiconductor nanoparticle bandgap. The semiconductor nanoparticles absorb the laser photon and phonons (heat) from lattice vibrations to photoluminescence photons with higher energy than the photon that were absorbed. A net cooling effect is generated from the lower energy and lower temperature in the material after anti-Stoke up-conversion.

5 Claims, 6 Drawing Sheets

METHOD FOR OPTICAL COOLING THROUGH SEMICONDUCTOR NANOPARTICLE ANTI-STOKES PHOTOLUMINESCENCE

This application is a divisional of U.S. patent application Ser. No. 17/514,038, currently pending, which is a divisional of U.S. patent application Ser. No. 16/583,366, filed Sep. 26, 2019, now U.S. Pat. No. 11,199,343, each of which is incorporated by reference herein in there entirety.

STATEMENT REGARDING FEDERALLY SPONSORED RESEARCH OR DEVELOPMENT

This invention was made with Government support under contract N68335-18-C-0318 awarded by the U.S. Department of Defense The Government has certain rights in the invention.

BACKGROUND AND SUMMARY OF THE INVENTION

The present invention is a novel process to optically cool a material or surface. Particularly, the present invention is concerned with a process to cool a material containing semiconductor nanoparticles, commonly called quantum dots, by exciting the valence band electrons of the quantum dots with a laser and emitting higher energy photons through anti-Stokes up-conversion. By emitting photons with a higher energy than the photons that are absorbed, the quantum dots and the surrounding material contain less energy and the temperature is reduced. This can be used to cool just the substrate containing the quantum dots or a material in thermal contact with the substrate. Anti-Stokes emission also has applications in improving performance in all other photo-electronic devices (e.g., photovoltaics).

The concept of optical cooling was first proposed in 1929. However, its potential as a simple, effective cooling process free of moving parts has not yet been fully realized. In many ways, it seems counter-intuitive to cool a surface by irradiating it with a laser; however, the process occurs when the surface of a solid absorbs photons from the laser and then emits photons with a higher energy by coupling them with phonons (lattice vibrations). In fact, there initially was much debate as to whether optical cooling violates the second law of thermodynamics. The debate was finally settled by accounting for the low entropy of coherent laser photons compared with the high entropy of scatter photons after fluorescence.

Optical cooling has many advantages over other cooling methods, particularly for cryogenic cooling and cooling in highly confined spaces. Unlike mechanical cooling systems, optical cooling has no moving parts and therefore can have significantly longer lifetimes. This makes optical cooling advantageous for space applications where maintenance is not an option and vibration is a critical factor. Also optical cooling is advantageous in rugged environments such as those that night vision goggles users might experience where impact and jostling could degrade performance. And unlike mechanical systems, optical cooling is silent, providing a potential advantage for stealth applications. In comparison, Stirling coolers can be miniaturized and achieve cryogenic temperatures in a single stage, but the noise, vibration, and rapidly decreasing efficiency with lift can limit their application.

Optical cooling scales with thermal load because the cooling power is linearly proportional to the laser power. In addition, it can potentially cool to 10 K in a single stage. In comparison, vapor compression cooling systems require multiple cascaded stages and additional bottoming cycles to achieve the lift needed for cryogenic cooling. And unlike thermoelectric Peltier coolers, semiconductor optical coolers can theoretically achieve temperatures of 10 K. Although multi-stage Peltier coolers have been developed, the compounding inefficiency of 3-5 stages makes the overall system efficiency extremely low ($COP_{cool}$<0.001) and they are only capable of cooling to 160 K.

Despite these advantages, optical coolers have thus far demonstrated limited efficiency—2-3% at room temperature and even lower efficiencies at the temperature decreases. These optical coolers are based on rare-earth metal-doped glass materials. Optical cooling devices based on rare-earth metal-doped glass can theoretically cool to ~77 K but are then limited by Boltzmann statistics for electron populations because the electrons return to ground states and are not available for photoluminescence. However, semiconductors can potentially cool to ~10 K because they are governed by Fermi-Dirac statistics and have electrons available for photoluminescence at nearly all temperatures. Below 10 K, however, there exists a cooling limit due to phonon mobility drop off thereby limiting anti-Stokes cooling.

To date no optical cooling using semiconductors has been achieved in a bulk semiconductor solid. Achieving optical cooling in semiconductor solids has been difficult because of inefficiencies in the absorption and fluorescence conversion rate. The ratio of the number of photons emitted (or fluoresced) to the number of photons absorbed is defined as the quantum yield. A quantum yield <100% means some of the photon energy is being parasitically added to the system, reducing the cooling potential. Therefore, achieving quantum yield approaching 100% is required to provide net cooling from optical devices.

When an electron in a semiconductor is excited into the conduction band from the valence band, a paired hole is left in the valence band. When the electron-hole pair, or exciton, recombines it emits a photon with an energy equal to the difference in energy between the electron and hole. There are other mechanisms for the exciton, to recombine in non-radiative pathways. This non-radiative recombination typically emits phonons as the excited electron decreases in energy. In these mechanisms, the energy of the photon is converted largely to heat in the solid semiconductor and actively works against optical cooling. This is why high, near-unity quantum yield is vital to achieving net cooling in optical cooling devices and why semiconductor optical cooling has taken so many decades to achieve net cooling. In fact, the quantum yield is proportional to the cooling efficiency of optical coolers. Until recently, poor crystalline quality and defects led to low quantum yields in bulk semiconductors. However, quantum dots have recently been an active area of study with very high crystalline quality.

Nanostructured semiconductors have been proposed as solutions to the problem of low quantum yields and therefore low cooling efficiency of optical coolers. Semiconducting nanocrystals or quantum dots have very high quantum yields, a narrow emission band (<30 nm full-width at half maximum), and a broad excitation band. They experience quantum confinement of the electronic bandgap as the size of the particle decreases below a critical threshold, the Bohr radius of the material. The quantum confinement exhibited by quantum dots means that the bandgap, and therefore the photoluminescence, can be tuned based on the size of the nanocrystal. Therefore, a material like CdSe can be used to achieve emission across the visible spectrum nearly continuously from red to blue. Because the size of the nanostructure is smaller than the emission wavelength, that chance of the emitted photon being extracted is high compared to bulk semiconductors where the photon is typically reabsorbed.

However, there are still many challenges that quantum dots face to supplant rare-earth metals. Some of the issues associated with quantum dot up-converters include thermal quenching, photobleaching, blinking, and environmental stability. For blinking there are two mechanisms: Auger and hot carriers. Many of these losses are exacerbated by higher temperatures. Some of these effects can be reduced by the choice of ligands and shell thickness when creating core/shell quantum dots. To overcome this limitation, the quantum dot surface must be passivated from dangling bonds or defects. The ligands and shells used to passivate the surface play a large role in the ultimate quantum yield and therefore the efficiency of the optical cooling device. In addition, the solvent and/or matrix film that surrounds the quantum dots will have an effect on the quantum yield and need to be carefully tailored. To date, cooling has only been demonstrated on single nano-ribbons despite attempts to achieve net cooling in bulk (centimeter scale) samples.

An object of the present invention is to select materials and equipment such that the quantum dot band gap, laser wavelength, absorption peak, excitation peak, and polymer transmission all work in conjunction. One way this can be achieved is to select quantum dot (QD) composition and structure; measure absorbance and fluorescence at varying QD size to tune bandgap; select QD size with wide variation between peak absorption and photoluminescence to minimize secondary absorption of emitted photons; optimize excitation wavelength to maximize quantity of emitted photons and size of anti-stokes shift in emitted photons; select laser with wavelength near optimized excitation wavelength; optimize QD size such that peak absorbance wavelength occurs near laser wavelength; and select a polymer for QD distribution with a high transmission at selected laser wavelength, while being compatible with the QD suspension, and with high thermal conductivity.

Another objective of the invention is to fabricate a QD cooling system by mixing QD in polymer, applying the mixed QD in polymer to a sample to be cooled, adding reflective layer, and setting up an impinging laser with, if necessary, a bandpass filter by; optimizing QD loading in polymer to maximize quantum yield; apply reflective backing layer to QD/polymer composition to direct emitted photons away from surface to be cooled; sealing the sample in vacuum housing to reduce convective and conductive thermal losses such that one side of vacuum is connected to surface to be cooled; and assemble a lens opposite the QD/polymer in the vacuum region to focus emitted photons to fiber optic for transmission. Alternatively, the QDs can be formed into a 2 dimensional array using methods such as Meier rod coating. Such two-dimensional photonic crystal film leads to net cooling because of the reduction of bulk readsorbtion.

Another objective of the invention is to irradiate a QD/polymer composition with a laser to drive anti-Stokes photoluminescence and create net cooling.

An addition object of the present invention is to provide a process for optically cooling a substrate by radiating quantum dots at a specifically tuned laser wavelength, characterized by: selecting a quantum dot composition and structure; selecting a laser wavelength to maximize a quantity of emitted photons and amount of anti-Stokes shift in emitted photons; selecting a quantum dot diameter such that peak absorbance and emission occurs at the selected laser wavelength; and selecting a polymer with a high transmission at the selected wavelength in order to either suspend the quantum dots and form a quantum dot matrix or create a two dimensional array of quantum dots.

A further object of the present invention is to provide a method of fabricating a quantum dot cooling system for a surface using a vacuum housing and a lens to move photons to a fiber optical cable, characterized by: mixing quantum dots in a polymer to form a quantum dot matrix or creating a two dimensional quantum dot photonic crystal film; applying a reflective backing layer to the quantum dot matrix to direct any emitted photons away from the surface to be cooled; placing the quantum dot matrix in the vacuum housing; and placing a lens in or near the vacuum housing and opposite the quantum dot matrix to focus any emitted photons to the fiber optic cable for transmission.

A further object of the present invention is to provide a method of fabricating a quantum dot cooling system for a surface using a vacuum housing, a bandpass filter, and a lens to move photons to a fiber optical cable, characterized by: mixing quantum dots in a polymer to form a quantum dot matrix; applying a reflective backing layer to the quantum dot matrix to direct any emitted photons away from the surface to be cooled; placing the quantum dot matrix in the vacuum housing; positioning a bandpass filter to receive any emitted photons and direct photons to the lens; and positioning the lens to receive any emitted photons from the bandpass filter and focus photons to the fiber optical cable.

Yet another object of the present invention is to provide a process of optically cooling, characterized by: selecting a material containing quantum dots and a laser such that the quantum dot band gap, laser wavelength, absorption peak, excitation peak, and polymer transmissivity are optimized; fabricating a quantum dot cooling system by providing the material containing quantum dots and the laser selected in step a), adding a reflective layer to the selected material containing quantum dots, applying the selected material containing the quantum dots having the reflective layer to a surface to be cooled, and positioning a laser device to impinge on the selected material containing the quantum dots having the reflective layer the selected laser wavelength; and irradiating the selected material containing the quantum dots having the reflective layer with a laser beam having selected the laser wavelength to drive anti-Stokes photoluminescence in order to create a net cooling on the surface to be cooled.

Other objects, advantages and novel features of the present invention will become apparent from the following detailed description when considered in conjunction with the accompanying drawings and non-limiting examples herein.

DETAILED DESCRIPTION OF THE DRAWINGS

Figure 1:
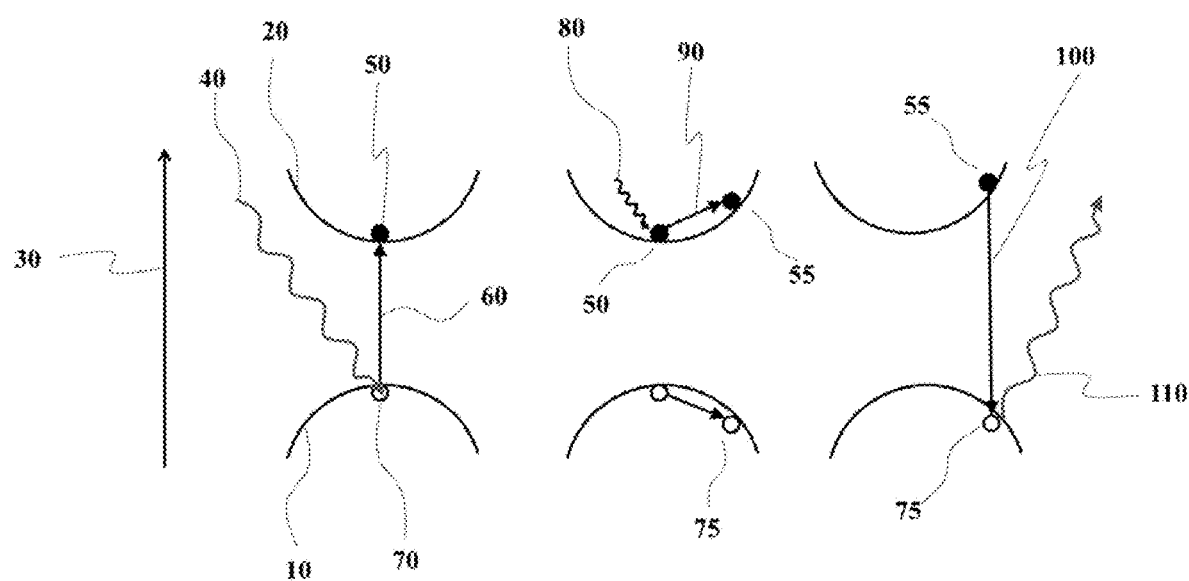
FIG. 1 is a general schematic of the photon absorption and anti-Stokes photoluminescence process for semiconductor nanoparticles.

The absorption and emission process of a semiconductor is illustrated in FIG. 1. The semiconductor material has a bandgap between the conduction 20 (upper) and valence (lower) bands 10. As the material absorbs a photon 40, an electron 50 is excited 60 to the conduction band 20 leaving behind a positively charged "hole" 70 or absence of an electron in the valence band 10. The excited electron 50 and hole 70 pair is called an exciton. The excited electron 50 can absorb heat in the form of a phonon 80 to increase its energy level 90. The hole can similarly be brought to an increased energy level 75 through phonon interactions with neighboring electrons. If the further excited electron 55 releases a phonon to return to its lower energy state and recombines with the hole, it will emit (or fluoresce) a photon that is lower in energy. This process is called Stokes shift and is not depicted in FIG. 1. Alternatively, if the further excited electron 55 recombines 100 with the higher energy hole 75, the emitted photon 110 will have a higher energy than the excitation photon 40. This is depicted in FIG. 1 and is called anti-Stokes or up-conversion of photons. Anti Stokes up-conversion of photons is the basis for optical cooling.

Figure 2:
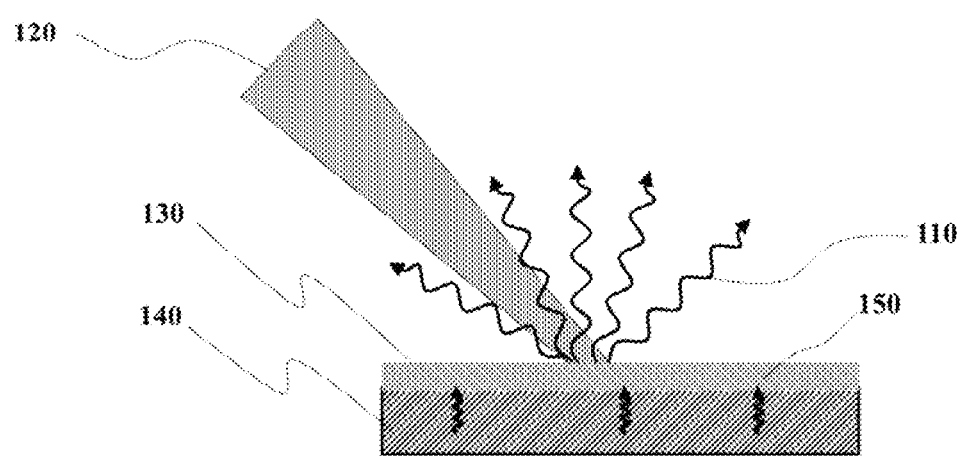
FIG. 2 is a simplified schematic representation of the optical cooling process using laser excitation and anti-Stokes photoluminescence.

FIG. 2 depicts a simplified representation of the optical cooling device based on quantum dot anti-Stokes up-conversion. The substrate containing quantum dots 130 absorbs photons from the impinging laser 129 as well as phonons 150 (heat) from the surrounding media 149. The quantum dots then photoluminesce, which releases photons 110 with higher energy than the laser 120 photons, to generate a net cooling effect. The quantum dots are immobilized in an optically transparent matrix to form a stable substrate 130. The surface to be cooled 140 should be in thermal contact with the quantum dot substrate 130 in order to draw phonons 150 (heat) out of the underlying surface to be cooled 140.

Figure 3:
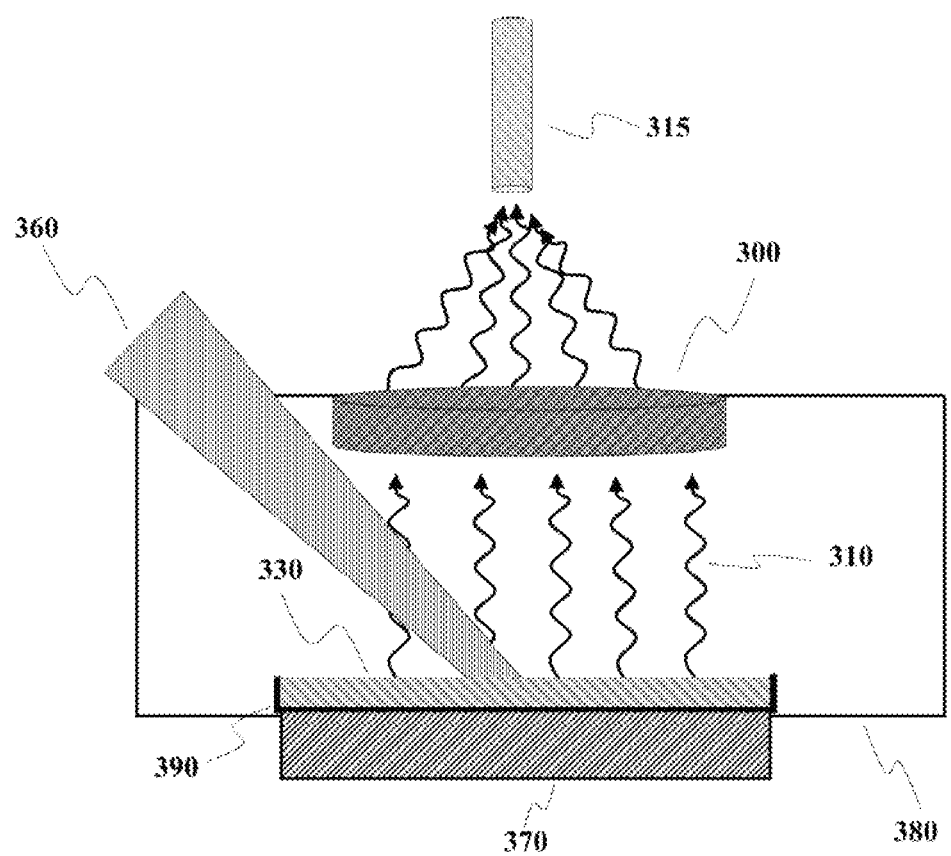
FIG. 3 is a schematic representation of an optical cooling device based on emitting anti-Stokes shifted photons in a vacuum and withdrawing them from the surface using an optical lens directed toward a fiber optic cable.
Figure 4:
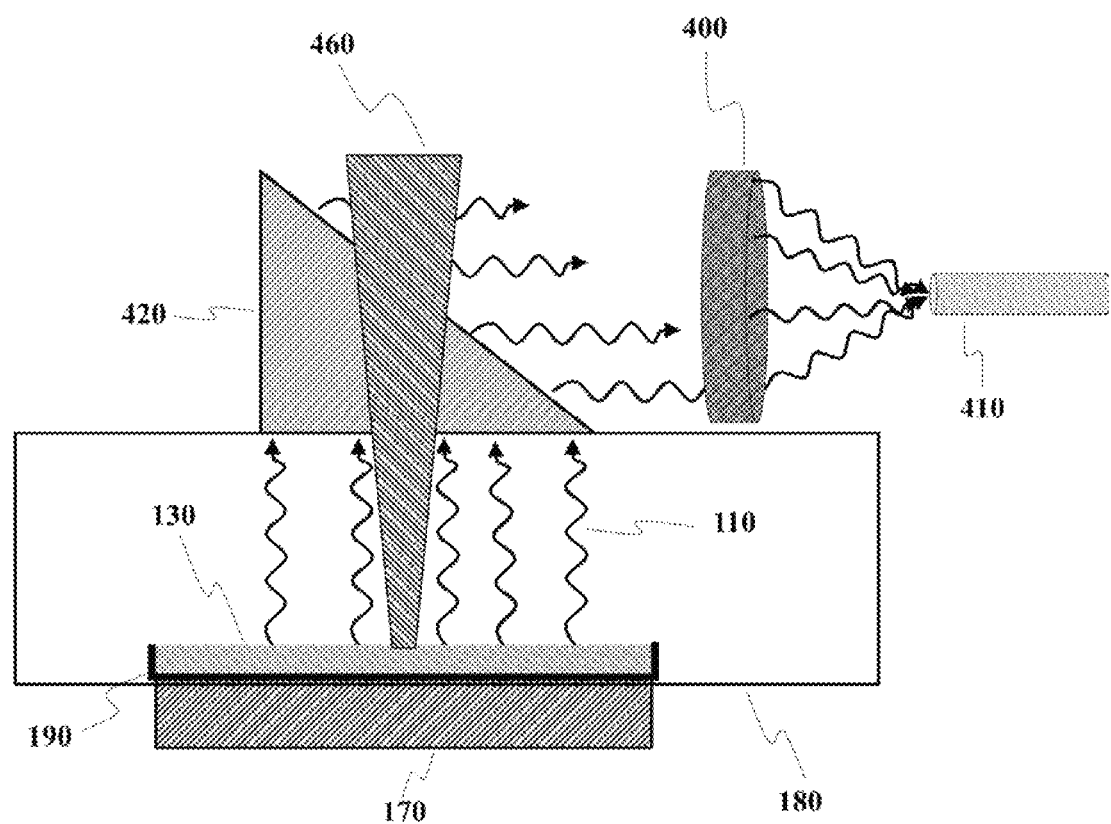
FIG. 4 is an alternative schematic representation of an optical cooling device based on emitting anti-Stokes shifted photons in a vacuum and withdrawing them from the surface through a bandpass filter which allows the excitation laser to pass through while filtering the anti-Stokes shifted photons to an optical lens and fiber optic cable.

FIGS. 3-4 detail a couple examples of optical cooling device architectures. However, the examples are not limiting and modifications can be made to our novel process to be applied more broadly by one skilled in the art.

FIG. 3 shows an exemplary, simplified design for an optical cooling device architecture. For the optical cooling device to achieve net cooling and compete with other cooling technologies in terms of efficiency, photon management is pivotal. After the photons have been upconverted (anti-Stokes shift) and emitted from the quantum dots, any ab sorption of the photon by the substrate, matrix material, or device housing will only contribute to parasitic heat losses. Rejecting as many of the emitted photons as possible outside the system is key to achieving net cooling. To that end, strategies were developed to direct the emitted photons to a fiber-optic cable for rejection. Several strategies were considered including index-matched dome lens to extract photons normal to the dome, nanogap structuring, or a gradient structure to the bandgap in the quantum dot matrix. However, most of the strategies did not reject the photons outside the device house or would add significant thermal mass to the system.

Therefore, an architecture was devised as depicted in FIG. 3 as a possible solution to directing photons. The system consists of a laser pump 360 impinging on a quantum dot-matrix 330, which is formed from mixing the quantum dots into a liquid polymer before the polymer sets, in thermal contact with the substrate to be cooled 370. The quantum dot-matrix is inside the device housing 380, which is under vacuum to avoid heat losses. To keep the photons emitted from the quantum dots or the laser pump from being absorbed by the housing or substrate, the quantum dot-matrix can be coated with a reflective metal 390 on all but the top surface. This ensures that the emitted photons 310 would all be rejected away from the substrate 370. The rejected photons are then focused by the use of an optical lens 300 near or at the device housing 380 boundary. The lens focuses the photons 310 to a fiber optical cable 315 where they are routed to an appropriate thermal dump, away from the cooling surface and device.

A secondary architecture is depicted in FIG. 4, where a bandpass filter is used to redirect the emitted photons out and away. The bandpass filter 428 allows low-wavelength light from the laser pump 460 through but would refract wavelengths below the bandpass (anti-Stokes wavelengths) away to an optical lens 400 and fiber optic cable 410. This architecture requires a bandpass filter that filters incoming laser photons at 640 nm from the up-converted emitted photons at 620-630 nm. The difference between the two wavelengths is too small for commercial bandpass filters.

Figure 5:
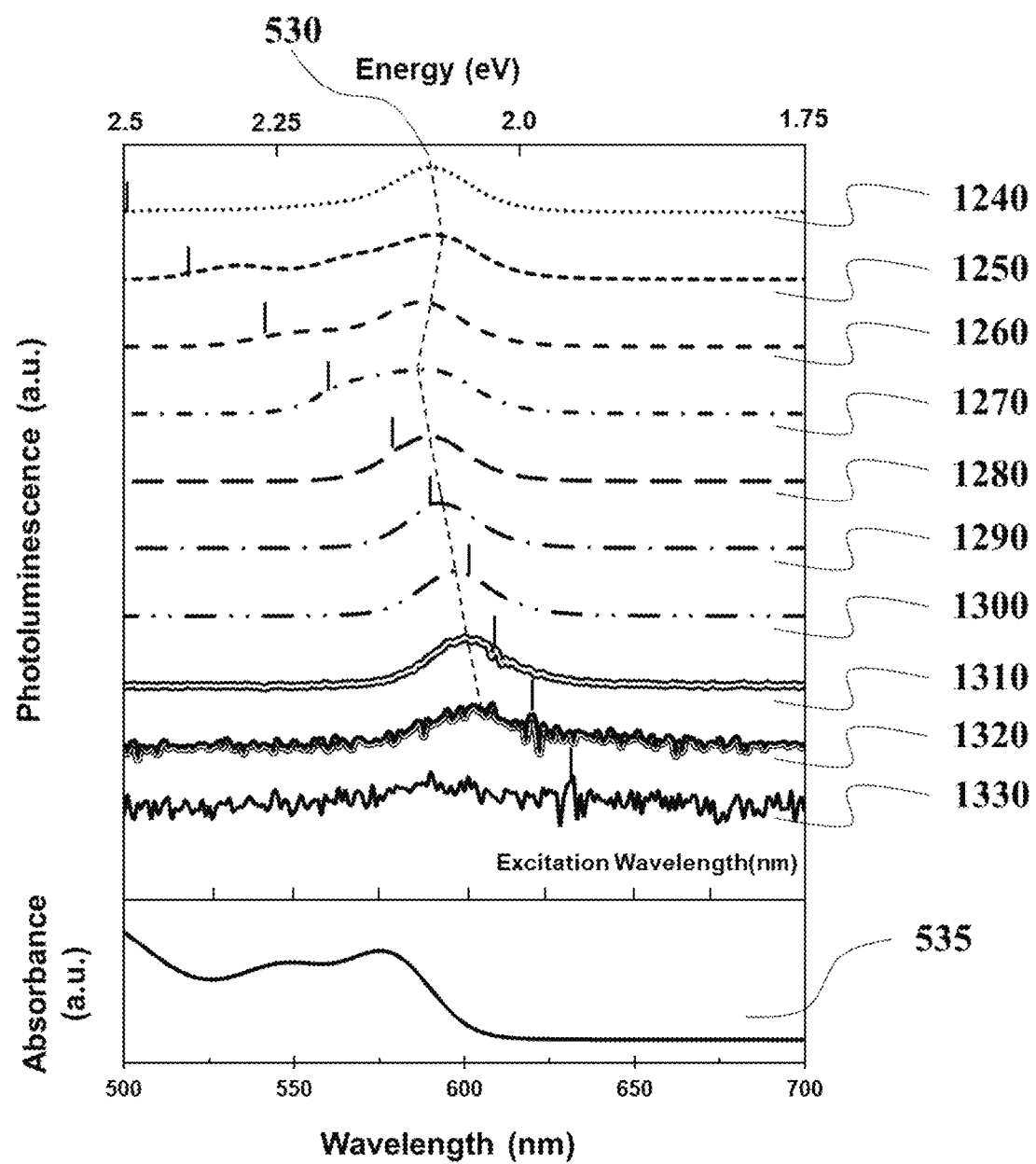
FIG. 5 is a graph showing the photoluminescence intensity from 500 to 700 urn at excitation wavelengths between 500 and 630 nm

FIG. 5 shows the photoluminescence spectra of CdSe quantum dots (~3.8 nm diameter) in chloroform for varied excitation wavelengths. The vertical lines above each spectra indicate the excitation source wavelength. The dotted line 530 indicates the photoluminescence peak wavelength as it changes based on excitation. When the source is at a higher energy, or lower wavelength, than the emitted photoluminescence there is a Stokes shift and net heating occurs. When the source is at a lower energy, higher wavelength, than the emitted photoluminescence, then an anti-Stokes shift occurs leading to net cooling.

To probe the propensity of quantum dots for anti-Stokes shift and cooling potential, we varied the excitation wavelength from 500 to 630 nm, based on the absorbance intensity 535, and scanned the photoluminescence spectrum from wavelengths 450 to 800 nm which corresponds to energies of 2.5 to 1.75 eV on the x-axis. The resulting photoluminescence spectra are plotted in FIG. 5 for each measured wavelength as 500 nm 1240, 520 nm 1250, 540 nm 1260 560 nm 1270, 580 nm 1289, 590 nm 1290, 600 nm 1300, 610 nm 1319, 620 nm 1320, and 630 nm 1330. As shown, the photoluminescence peak blue-shifts to lower wavelengths (higher energies) as the excitation wavelength increases. Above 600 nm, the peak photoluminescence has a lower wavelength (higher energy) than the excitation source. Therefore, the average photon that is emitted has more energy leaving than entering the system. Excitation wavelengths of 600-620 nm display anti-Stokes shift and optical cooling can be achieved under these conditions.

Although anti-Stokes shift occurs for excitation wavelengths of 600-620 nm, the total photoluminescence decreases significantly with higher excitation wavelength. This means fewer photons are contributing to cooling. At 630 nm 1330, so few photons are absorbed that the anti-Stokes photoluminescence signal is not perceivable above the signal noise. However, the cooling power per photon increases as the gap between excitation and photoluminescence peak grows. Therefore, there is a trade off in determining the optimum excitation wavelength for the overall cooling of the system. The range of anti-Stokes up-conversion shift is expected to change based on the bandgap of the quantum dots. Therefore, the bandgap of the quantum dots is tuned so the anti-Stokes region overlaps the wavelength of commercially available lasers.

To incorporate the quantum dots into the optical cooling device, they need to be immobilized in a thin, matrix film. This matrix film must not inhibit or adversely affect the optical absorption or re-emission of the photons. As such, the choice of the matrix material was vital. The key requirements of the matrix material are:

1. Very high transmission in the optical region (>90% over the range of 500-700 nm).
2. Compatibility with quantum dots needs to disperse quantum dots before setting and not require curing conditions that could negatively affect the optical properties of the quantum dots.
3. Resist photo-degradation.
4. Preferably exhibit high thermal conductivity.

The matrix materials we considered included silicone, siloxane, PMMA, and glass. PMMA has been successfully used as a matrix material for a quantum dot film achieving 95% quantum yield. PMMA also has a high optical transmission (>90%) in the optical range. In addition, PMMA is relatively straightforward to cure at low temperatures (<70° C.). Therefore, we down-selected PMMA as the matrix material to immobilize the quantum dots for the optical cooling film.

The PMMA-quantum dot matrix was formed by adding quantum dots dispersed in toluene (1 mg/mL) to solution of 0.1% by weight 2,2'-azobis(2-methylpropionitrile) (AIBN) in 50 mL methyl methacrylate. The AIBN acts as a free-radical generator to accelerate the polymerization of the methyl methacrylate. The solution was heated to 80° C. for 10 minutes to initiate the free radical generation and then maintained at 60° C. for 20 hours for the polymer to cure. The resulting PMMA-quantum dot matrix disc was 2.5 inches (6.35 cm) in diameter and inches (0.84 cm) thick. The discs were then mechanically polished to a 0.3 μm finish to achieve optical transparency. The resulting discs are homogenous in color and clarity with an optically clear surface free of scratches or blemishes.

The high transmission of light through PMMA is important because anything less than 100% is lost as parasitic heating. This can be seen from the following equation for expected cooling power ($P_{cool}$):

$$P_{cool} = P_{laser}\left(QY\frac{\lambda_{abs}}{\lambda_{PL}}A_{QD} - A_{matrix}\right)$$

where $P_{laser}$ is the power of the impinging laser, $\lambda_{abs}$ is the wavelength of light absorbed by the material, $\lambda_{PL}$ is the wavelength of photoluminescence, and A is the absorbance percentage for the quantum dots and the PMMA matrix material. In this case, $\lambda_{abs}$ is the wavelength of the laser and $\lambda_{PL}$ is the anti-Stokes wavelength. For high cooling power, we want the amount of light absorbed by the PMMA to be low and the amount absorbed by the quantum dots to be high.

Figure 6:
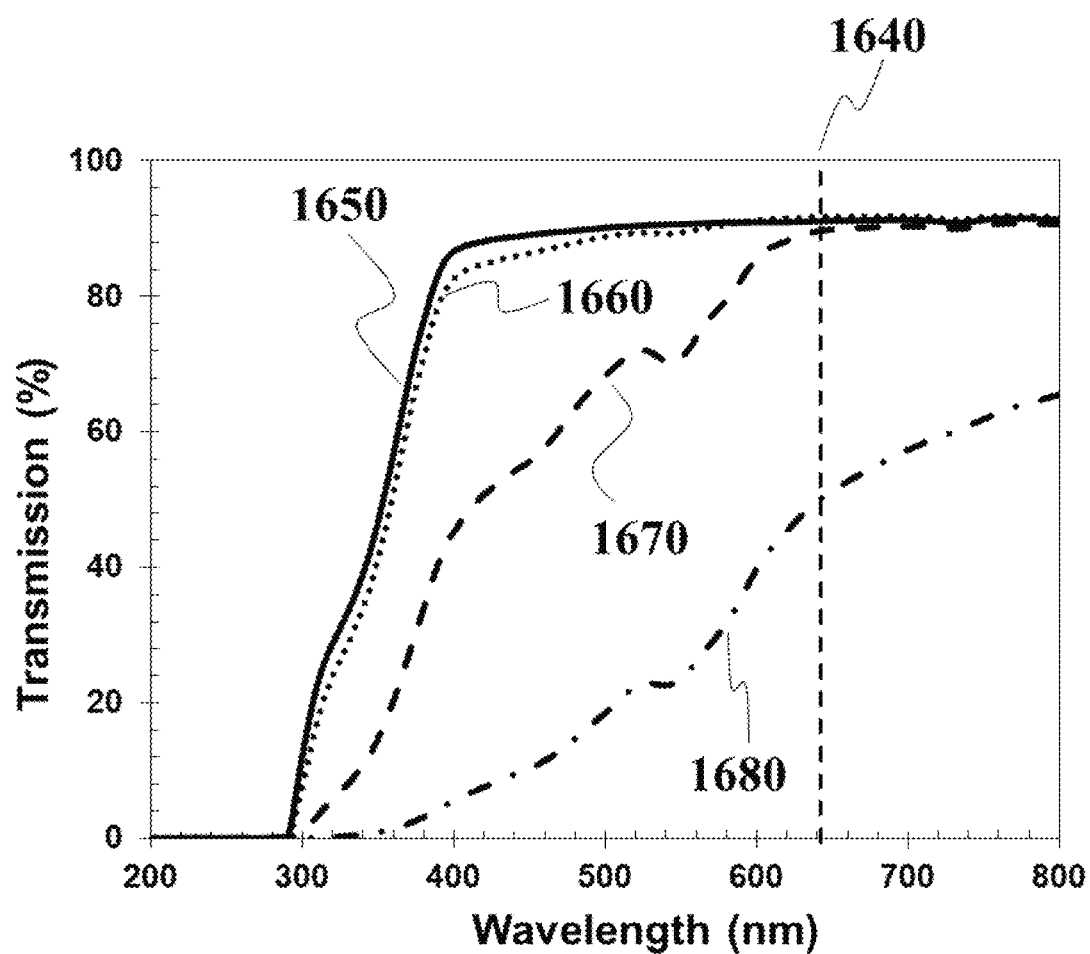
FIG. 6 is a graph showing the transmission of a 640 mu laser through PMMA disks with varying QD loadings from 10-300 µg/mL.

The transmission spectrum as a function of wavelength is shown in FIG. 6 for varying quantum dot loading concentrations of 0 μg/mL 1650, 10 μg/mL 1660, 100 μg/mL 1670, and 300 μg/mL 1680 in PMMA. A laser wavelength as 640 nm 1649 because is a common commercially available laser (helium-neon) in the range of expected anti-Stokes up-conversion for CdSe quantum dots which also has high transmission up to 100 μg/mL of quantum dots in PMMA.

A mirror-like thin film applied to the backside of the PMMA-quantum dot disc can be used to reflect both laser photons and anti-Stokes emitted photons away from the substrate to be cooled. To demonstrate the feasibility of the mirror coating, we performed thermal evaporation of chromium and aluminum on PMMA solids. Trials to thermally evaporate chromium on PMMA resulted in a powdery coating that was not well adhered, nor reflective. The best results were obtained by rapid deposition (>5 nm/s) of aluminum. The resulting film coating is uniform, reflective, and well adhered to the PMMA-quantum dot surface.

From the material properties, we calculated a materials-level coefficient of cooling performance ($COP_{cool}$) based on the following equation:

$$COP_{cool} = \frac{P_{cool}}{P_{laser}} = \left(QY\frac{\lambda_{abs}}{\lambda_{PL}}A_{QD} - A_{matrix}\right)$$

The material properties measured are tabulated below. All of these properties were measured at room temperature (~293 K). Therefore the calculated $COP_{cool}$=0.12 is for room temperature. It should be noted that the properties listed are expected to be a function of temperature. For example, the QY is known to increase with decreasing temperatures. In addition, there may be other thermal loss mechanisms not accounted for in the equation used. These include Stokes shift losses, photobleaching of the quantum dots, or any thermal losses from incomplete reflection of the mirror or incomplete transmission through the optical lens. Nevertheless, the calculated COP can be approximated as an upper limit.

| Properties | |
|---|---|
| Quantum Yield | 50% |
| $\frac{\lambda_{abs}}{\lambda_{PL}}$ | 1.02 |
| $A_{QD}$ | 41% |
| $A_{matrix}$ | 9% |
| $COP_{cool}$ | 0.12 |

While we have shown and described a novel process in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

We claim:

1. A process for optically cooling a substrate by radiating quantum dots at a specifically tuned laser wavelength, comprising:
   selecting a quantum dot composition and structure;
   selecting a laser wavelength to maximize a quantity of emitted photons and amount of anti-Stokes shift in emitted photons;
   selecting a quantum dot diameter such that peak absorbance and emission occurs at the selected laser wavelength; and
   selecting a polymer with a high transmission at the selected wavelength in order to either suspend the quantum dots and form a quantum dot matrix or create a two dimensional array of quantum dots.

2. The process of claim 1 wherein selecting the quantum dots diameter such that there is a wide variation between peak absorption and photoluminescence to minimize secondary absorption of emitted photons.

3. The process of claim 1 wherein the composition of the quantum dots creates an indirect bandgap toward minimizing readsorption of the higher-energy (anti-Stokes) photon through asymmetry in the excitonic wave function.

4. The process of claim 1 wherein selecting the quantum dot diameter involves measuring absorbance and fluorescence at a plurality of quantum dot diameters to tune bandgap.

5. The process of claim 1 wherein selecting the laser wavelength includes selecting a laser with a wavelength near optimized excitation wavelength.

* * * * *